Figure 1:
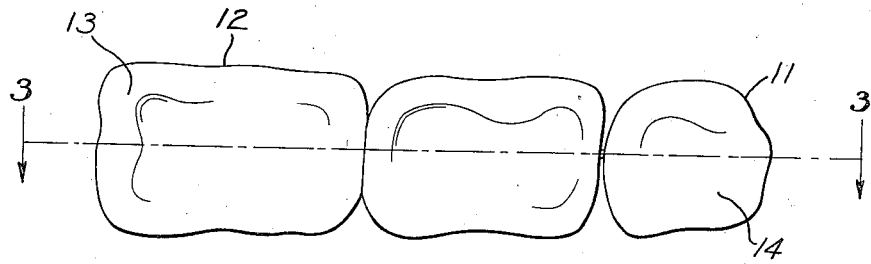

Sept. 13, 1938. C. D. MORTON 2,129,861

LOCK-PIN CONSTRUCTION FOR FIXED BRIDGEWORK

Filed Dec. 16, 1936

Inventor
Charles Dale Morton
By Minturn & Minturn
Attorneys

Patented Sept. 13, 1938

2,129,861

UNITED STATES PATENT OFFICE 2,129,861

LOCK-PIN CONSTRUCTION FOR FIXED BRIDGEWORK

Charles Dale Morton, Greenfield, Ind.

Application December 16, 1936, Serial No. 116,152

2 Claims. (Cl. 32—6)

This invention relates to the art of dental bridgework and has for a primary object the preservation of individual tooth movement under strain of mastication. It has been common practice heretofore to employ fixed bridgework in that the intervening bridge would be firmly anchored through metal and cement to the teeth on either side. As a matter of fact each tooth is normally cushioned by a membrane thereunder in order to relieve shock so that when the upper and lower teeth are brought into biting or chewing relationship, there is a slight downward or upward movement of the respective teeth as the case may be. Moreover each tooth has a limited lateral movement. Therefore it is readily apparent how the difficulty arose with the permanent fixed bridgework. When the upper and lower teeth were brought together in biting relationship, the anchoring teeth carrying the bridge therebetween would move or tend to move and this stress set up would result eventually in the cracking or breaking loose of the cement on the anchoring teeth with the resulting leakage and possible shifting of the bridge. This breaking loose of the fixed bridge became all the more probable when it is to be considered that it would be practically impossible with the human hand and eye to make cavity preparations on the fixed anchoring teeth which involve parallel lines of two or more bridge attachments and then make the accurate casings to seat and attach thereto.

In order to overcome this difficulty which was encountered with the fixed bridgework as explained, many dentists resorted to a removable bridge which had crab-like prongs gripping the anchoring teeth. Such work seems to be highly detrimental to those anchoring teeth in addition to other difficulties arising due to the shifting about of the bridge.

In my present invention, I provide a bridge to have a rigid attachment at one end to an anchoring tooth and a movable ball and socket attachment at the other end of the bridge to the other anchoring tooth whereby differences in alignment and allowances for individual tooth movement are provided for. Furthermore my invention overcomes difficulties heretofore encountered by expansion and contraction of investments of gold and silver. The invention further provides sufficient latitude to make the bridge very easily seated in the mouth.

I am aware of the prior use of dowel pin rests and occlusal lug rests. While either one of these devices have been widely used, they sometimes fail when teeth shift in position whereby the dowel pin no longer functions as a rest. When such drift occurs, bridges constructed with the dowel pin or occlusal lug rest, become worse than no appliance at all. As above indicated, with my construction, tooth drift is overcome and normal tooth movements under the strain of mastication are preserved.

Reference is made to the accompanying drawing, in which

Figure 2:
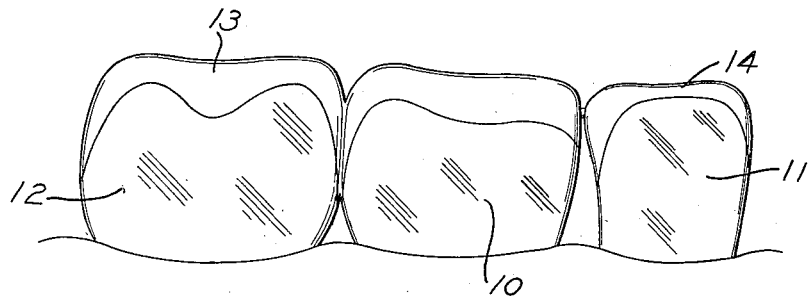
Figure 3:
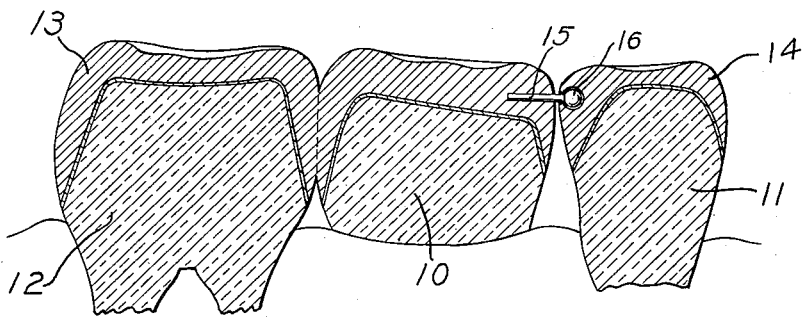

Fig. 1 is a top plan view on an enlarged scale of a bridge embodying the invention;

Fig. 2, a side elevation;

Fig. 3, a vertical elevation on the line 3—3 in Fig. 1.

Like characters of reference indicate like parts in the several views in the drawing.

In the drawing, a bridge 10 is shown as being provided between a bicuspid 11 and a second molar 12. In this particular instance, the tooth 12 is shaped in the usual manner to receive a metal attachment 13 thereover, the attachment being generally made of gold.

The tooth 11 is shaped to receive a metal attachment 14. In making this attachment 14, a pattern is made in the usual manner but is waxed a little more heavily than is normal. A pin 15 is formed to have any suitable type of head 16 forming an enlargement on the end of the pin, here shown as substantially spherical in shape. The ball or head 16 is coated with any suitable preparation which I term an anti-flux, and, after drying, the ball is pushed into the wax pattern at a point so that in the finished attachment 14, the pin will project laterally toward the fixed tooth 12. The attachment is then cast so that due to the material put around the ball, and also for a short length of the pin itself, the metal of the attachment will not adhere to the pin and ball but will be removed a thickness therefrom equal to the thickness of the coating.

The operator may then proceed in his usual manner in preparing the cap 13 and the bridge 10 to establish bite, etc., the thickness being no different until the bridge is to be attached to the pin 15. To do this, that part of the pin 15 immediately adjacent the attachment 14 is coated with the protecting anti-flux material so as to prevent solder or the like from adhering thereto. The remainder of the pin 15 must be left clean so that it may be soldered in position in the metal cap of the bridge 10 as indicated in Fig. 3. Likewise the metal cap of the bridge 10 is firmly and rigidly united with the cap 13 of the tooth 12 by any suitable means such as by soldering along some such plane as indicated by the dash line.

The entire structure now consists of the bridge 10 rigidly united to the cap 13 and connected to the cap 14 through the pin 15. The anti-flux material is then dissolved and washed out from around the head 16 of the pin 15 so that the head is free to rock within limits in the cap 14. In other words, there is a universal joint connection made between the bridge 10 and the cap 14. The attachments 13 and 14 are then positioned over the respective teeth 12 and 11 and cemented firmly in position.

It is thus to be seen that the bridge is rigidly anchored by one side to the tooth 12 but has a movable joint connection at the other side with the tooth 11. This enables one attachment to be movable in respect to the other attachment, thereby providing for individual tooth movement under stress. Furthermore this ball and socket connection in the finished product gives the fixed bridge enough latitude to make the appliance much more easily seated in the mouth on the fixed teeth. It is readily apparent that in the structure described, should the tooth 12 tend to move laterally to the left, the bridge 10 will not be separated from the tooth 11 although movably connected thereto since the head 16 will resist such tendency by causing the tooth 11 to either remain stationary or move therewith. The reverse tendency of movement such as would be set up by shifting of the tooth 11 is likewise resisted through the bridge by the tooth 12. Again in biting, the movement of the tooth 12 is not restrained since the bridge 10 may move therewith by reason of its universal connection with the tooth 11 and likewise the tooth 11 may move independently in its normal movement, with respect to the tooth 12.

While the invention has herein been described in the one particular form, it is obvious that structural variations may be employed without departing from the spirit of the invention and I, therefore, do not desire to be limited to that precise form beyond the limitations as may be imposed by the following claims.

I claim:

1. In a method of preparing a dental bridge between two teeth those steps which comprise forming a wax pattern for one tooth attachment, coating a ball end of a pin with a metal anti-flux to a fixed clearance thickness, warming the end and inserting it into the wax, working over the outside of the ball down to the pin, investing and casting the attachment about said ball end to have said pin extending therefrom in a rockable manner and washing out said anti-flux to leave said clearance.

2. That method of preparing a dental bridge between two teeth which comprises forming a wax pattern for one tooth attachment, coating a ball end of a pin with a metal anti-flux to a fixed uniform clearance thickness, warming the end and inserting it into the wax, working the wax over the outer side of the ball end to retain it in the wax, investing and casting the attachment to have said pin extending therefrom in a rockable manner, preparing an attachment for said other tooth, preparing a bridge, fixing the bridge rigidly to said last attachment, inserting and bonding said extending pin in said bridge to connect thereto said first attachment, and fitting and securing said attachments rigidly to their respective teeth, coating said pin with anti-flux immediately adjacent said first attachment to prevent bonding of the pin in fixed position to that attachment, and washing away of all of said anti-flux after bonding to give the pin and ball clearance to rock in its attachment, the clearance being that of the thickness of the anti-flux originally applied to said ball and removed.

CHARLES DALE MORTON.